US012332588B2

(12) United States Patent
Honke

(10) Patent No.: US 12,332,588 B2
(45) Date of Patent: Jun. 17, 2025

(54) IMAGE HEATING DEVICE HAVING HEATING ELEMENT GROUPS AND SAFETY ELEMENTS FOR SHUTTING OFF POWER TO THE HEATING ELEMENT GROUPS

(71) Applicant: Canon Kabushiki Kaisha, Tokyo (JP)

(72) Inventor: Takashi Honke, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/170,132

(22) Filed: Feb. 16, 2023

(65) Prior Publication Data

US 2023/0266700 A1 Aug. 24, 2023

(30) Foreign Application Priority Data

Feb. 22, 2022 (JP) ................................ 2022-025647

(51) Int. Cl.
*G03G 15/20* (2006.01)
*G03G 15/00* (2006.01)

(52) U.S. Cl.
CPC ..... *G03G 15/2039* (2013.01); *G03G 15/2042* (2013.01); *G03G 15/2053* (2013.01); *G03G 15/80* (2013.01); *G03G 2215/2035* (2013.01)

(58) Field of Classification Search
CPC ....... G03G 15/2039; G03G 2215/2035; G03G 15/80; G03G 15/2042; G03G 15/2053; G03G 15/2046
See application file for complete search history.

(56) References Cited

U.S. PATENT DOCUMENTS 5,592,276 A * 1/1997 Ohtsuka ............. G03G 15/2064 338/307
2002/0057919 A1* 5/2002 Tomatsu ............ G03G 15/2042 399/69

(Continued)

FOREIGN PATENT DOCUMENTS

JP 2009-156963 A 7/2009
JP 2017-054071 A 3/2017

(Continued)

OTHER PUBLICATIONS

Japanese Office Action issued on Jun. 27, 2023 in counterpart Japanese Patent Appln. No. 2022-025647.

*Primary Examiner* — Stephanie E Bloss
*Assistant Examiner* — Laura Roth
(74) *Attorney, Agent, or Firm* — Venable LLP

(57) ABSTRACT

An image heating device includes a heater having a plurality of heating elements which includes a first heating element group and a second heating element group, a control portion which supplies power to the first heating element group through a first common circuit and supplies power to the second heating element group through a second common circuit. The first common circuit includes a first safety element which responds to the temperature of the heating elements included in the first heating element group, and the second common circuit includes a second safety element which responds to the temperature of the heating elements included in the second heating element group. The first safety element is arranged on one side with respect to a conveyance reference position of a recording material, and the second safety element is arranged on the other side with respect to the conveyance reference position.

16 Claims, 11 Drawing Sheets

(56) References Cited

U.S. PATENT DOCUMENTS

| | | | | |
|---|---|---|---|---|
| 2003/0123891 A1* | 7/2003 | Takano | G03G 15/2042 | 399/69 |
| 2003/0198481 A1* | 10/2003 | Kikuchi | G03G 15/2042 | 399/69 |
| 2003/0219271 A1* | 11/2003 | Kinouchi | G03G 15/2042 | 399/69 |
| 2004/0265021 A1* | 12/2004 | Kinouchi | G03G 15/2042 | 399/334 |
| 2005/0175367 A1* | 8/2005 | Urabe | G03G 15/205 | 399/69 |
| 2005/0258158 A1* | 11/2005 | Takami | G05D 23/1932 | 219/216 |
| 2016/0085187 A1* | 3/2016 | Takagi | G03G 15/2053 | 399/69 |

FOREIGN PATENT DOCUMENTS

| | | |
|---|---|---|
| JP | 2018-017910 A | 2/2018 |
| JP | 2021-128346 A | 9/2021 |
| JP | 2022-030133 A | 2/2022 |

* cited by examiner

IMAGE HEATING DEVICE HAVING HEATING ELEMENT GROUPS AND SAFETY ELEMENTS FOR SHUTTING OFF POWER TO THE HEATING ELEMENT GROUPS

BACKGROUND OF THE INVENTION

Field of the Invention

The present invention relates to an image forming apparatus such as a printer, a copier, and the like that uses an electrophotographic method. The present invention also relates to a fixing device mounted on an image forming apparatus, or an image heating device such as a gloss imparting device that improves a gloss value of a toner image by reheating the toner image fixed to a recording material.

Description of the Related Art

A fixing device of a film heating type is known as a fixing device used in an electrophotographic image forming apparatus. In the fixing device of a film heating type, the temperature rise in a non-paper-passing portion described below is known to be a problem. The temperature rise in the non-paper-passing area is a phenomenon in which where small-size paper is continuously printed in an image forming apparatus using such a fixing device, the temperature of the area where the paper does not pass in the longitudinal direction of a nip portion gradually rises. Where the temperature of the non-paper-passing portion becomes too high, each part in the apparatus, such as a heater, a fixing film, and a pressure roller, will be damaged. Also, when large-size paper is printed while the temperature of the non-paper-passing area is rising, a phenomenon such as high-temperature offset of toner may occur in the area corresponding to the non-paper-passing portion of small-size paper.

As one means for suppressing the temperature rise in the non-paper-passing portion, a fixing device having the configuration shown in Japanese Patent Application Publication No. 2017-54071 has been proposed. That is, the fixing device includes a heater (hereinafter referred to as a split heater) in which a heating resistor (heating element) is arranged on a substrate while being divided in the longitudinal direction of the heater. By using this configuration, the heating element on the heater can be split into a plurality of heating areas (hereinafter referred to as heating blocks FIB) in the longitudinal direction of the heater, and the heat generation distribution of the heater can be switched according to the size of the recording material. By doing so, it is possible to suppress the temperature rise in the non-paper-passing portion even when small-size paper is passed.

Furthermore, Japanese Patent Application Publication No. 2017-54071 proposes a configuration in which a circuit for supplying power to a plurality of heating elements is shared. That is, a configuration in which a common drive is used to supply power to a plurality of heating blocks installed left-right symmetrically with respect to the center of the paper. By adopting this configuration, it is possible to reduce the size and cost of the device and save energy.

SUMMARY OF THE INVENTION

When using a fixing device using a split heater, it is desirable to provide a safety element for each drive circuit in consideration of failure of the device. That is, it is desirable to install a safety element in at least one of a plurality of heating blocks to which power is supplied by a common drive circuit. Where one of the drive circuits becomes uncontrollable and generates abnormal heat, a safety element installed in each drive circuit will detect the high temperature and the power supply can be quickly stopped. Here, as a safety element, a small thermostat (hereinafter referred to as a thermoswitch) is widely used from the viewpoint of function and cost.

In particular, thermoswitches that are to be arranged in narrow spaces such as the internal space of a fixing film often have to be shaped to be elongated in the longitudinal direction of the fixing film in order to function as a safety element. Since such a thermoswitch has connector terminals at both longitudinal ends of the thermoswitch, a certain margin is required as an installation space in the longitudinal direction of the fixing film. Meanwhile, depending on the number of divisions of the heating blocks of the heater, the longitudinal width of each heating block may become narrower. Therefore, when a thermoswitch is to be arranged in each of the adjacent heating blocks, the space in the longitudinal direction of the thermoswitches becomes cramped, making it difficult to arrange the thermoswitches.

An object of the present invention is to provide a technique that can ensure safety without being restricted by the device layout.

In order to achieve the above object, the image heating device of the present invention has the following:

- a heater having a plurality of heating elements arranged in a width direction of a recording material perpendicular to a conveyance direction of the recording material;
- a nip forming portion that forms a nip where the recording material is nipped; and
- a control portion that controls power supplied to the plurality of heating elements;
- wherein the image heating device heats an image formed on the recording material, which is nipped in the nip, by heat of the heater;
- wherein the plurality of heating elements include a first heating element group and a second heating element group, the first heating element group being arranged symmetrically with respect to a conveyance reference position of the recording material in the width direction and the second heating element group being arranged symmetrically with respect to the conveyance reference position so as to be adjacent to the first heating element group in the width direction;
- wherein the control portion supplies power to the first heating element group through a first common circuit, and supplies power to the second heating element group through a second common circuit;
- wherein in the image heating device,
  - the first common circuit includes a first safety element arranged at the heater to respond to the temperature of the heating elements included in the first heating element group; and
  - the second common circuit includes a second safety element arranged at the heater to respond to the temperature of the heating elements included in the second heating element group;
- wherein the first safety element is arranged on one side with respect to the conveyance reference position in the width direction, and
- wherein the second safety element is arranged on the other side with respect to the conveyance reference position in the width direction.

In order to achieve the above object, the image forming apparatus of the present invention has the following:

an image forming portion that forms an image on a recording material; and a fixing portion that fixes the image formed on the recording material to the recording material;

wherein the fixing portion is the image heating device of the present invention.

According to the present invention, it is possible to ensure safety without being restricted by the device layout.

Further features of the present invention will become apparent from the following description of exemplary embodiments with reference to the attached drawings.

DESCRIPTION OF THE EMBODIMENTS

Figure 1:
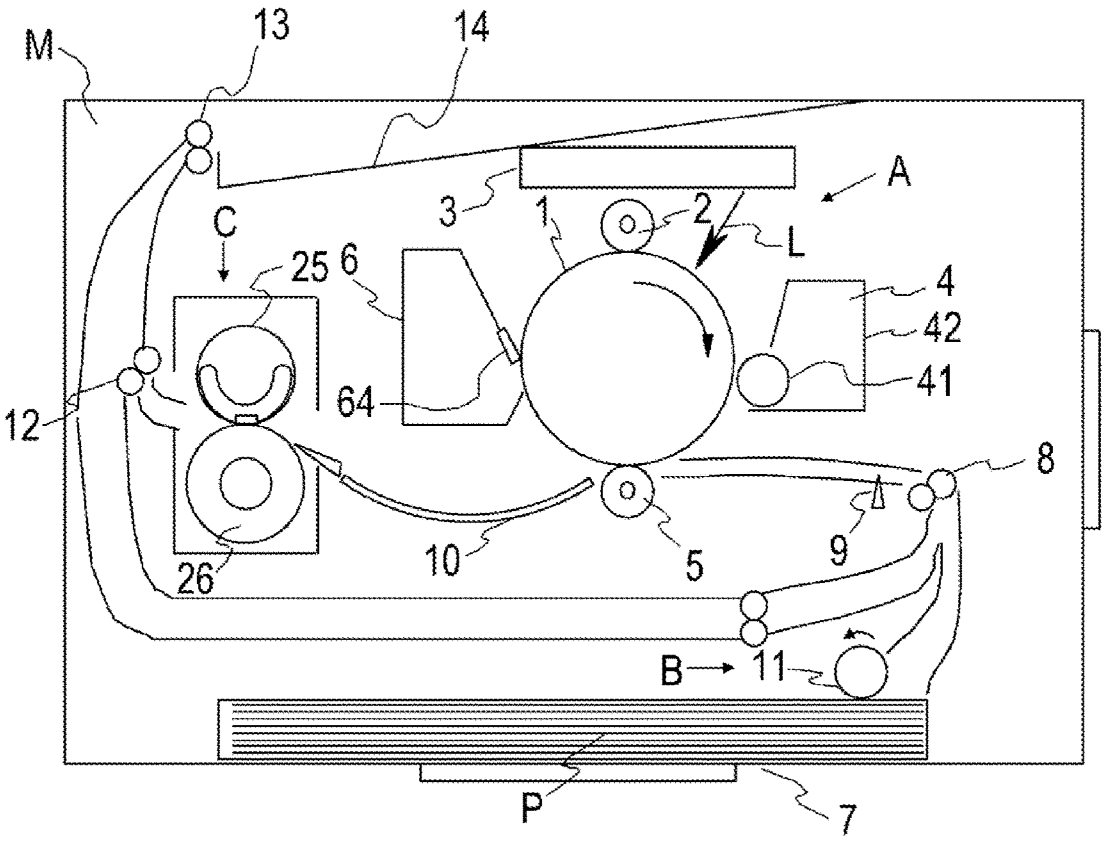
FIG. 1 is a schematic cross-sectional view of an image forming apparatus according to Embodiment 1.

Referring to the drawings, forms for carrying out the present invention will be described in detail by way of example on the basis of an embodiment example. Note that dimensions, materials, shapes, relative positioning, and the like of components described in each of embodiments are to be appropriately changed in accordance with configurations of an apparatus and a device to which the invention is applied and various conditions, and are therefore not intended to limit the scope of the invention to the following embodiments.

Embodiment 1

FIG. 1 is a schematic cross-sectional view of an image forming apparatus 100 according to an embodiment of the present invention using electrophotographic recording technology. Examples of image forming apparatuses to which the present invention can be applied include copiers, printers, and the like using an electrophotographic method or an electrostatic recording method. A case of application to a laser printer that forms an image on a recording material P such as recording paper by using an electrostatic recording method will be described herein.

Schematic Configuration of Image Forming Apparatus

FIG. 1 is a schematic cross-sectional view of an example of an image forming apparatus according to Embodiment 1 of the present invention. This image forming apparatus includes an image forming portion A that forms a toner image on a recording material, a recording material feeding portion B that feeds the recording material to the image forming portion A, and a fixing portion (fixing device) C that heats and fixes a toner image on the recording material to the recording material. The image forming portion A has a drum-type electrophotographic photosensitive member (hereinafter referred to as a photosensitive drum) 1 as an image bearing member. The photosensitive drum 1 is rotatably supported by an apparatus main body M of the image forming apparatus 100 constituting a housing of the image forming apparatus. A charging roller 2, a laser scanner 3, a developing device 4, a transfer roller 5, and a cleaning device 6 are arranged in this order around the outer peripheral surface of the photosensitive drum 1 along the rotation direction thereof. The recording material feeding portion B has a delivery roller 11. The delivery roller 11 is rotated in the direction of the arrow at a predetermined timing by a conveyance drive motor (not shown) to deliver the recording material P stacked and accommodated in a cassette 7 to a conveyance path.

The image forming apparatus of Embodiment 1 has a control portion (not shown) that controls the image forming portion A, the recording material feeding portion B, the fixing device C, and the like. The control portion is composed of a CPU and a memory such as ROM and RAM, and various programs required for image formation are stored in the memory. This control portion receives a print signal from an external device such as a host computer and executes a predetermined image formation control sequence on the basis of the print signal. As a result, the drum motor is driven to rotate, and the photosensitive drum 1 rotates in the direction of the arrow at a predetermined peripheral speed (process speed). The surface of the rotated photosensitive drum 1 is uniformly charged to a predetermined potential having the same polarity as the toner (negative polarity in this case) by the charging roller 2. The laser scanner 3 scans the charged surface of the photosensitive drum 1 with a laser beam L on the basis of image information to expose the surface of the photosensitive drum 1. As a result of the exposure, the charge is removed from the exposed portion and an electrostatic latent image is formed on the surface of the photosensitive drum 1.

The developing device 4 has a developing roller 41 and a toner container 42 accommodating the toner. The toner is rubbed by a member such as a urethane blade (not shown) and charged to a predetermined polarity (negative polarity in Embodiment 1). When a negative voltage is applied to the developing roller 41 from a developing voltage power source (not shown) in the developing device 4, the toner is caused to adhere to the electrostatic latent image on the surface of the photosensitive drum 1 by using a potential difference, and the latent image is developed as a toner image T. The toner image T formed on the surface of the photosensitive drum 1 is transferred to the recording material P by applying a positive voltage having a polarity opposite to that of the toner to the transfer roller 5 and utilizing the potential difference created by the transfer voltage. Further, the conveyance drive motor provided in the recording material feeding portion B is rotationally driven, and the delivery roller 11 delivers the recording material P from the cassette 7 to the conveyance roller 8. The recording material P is conveyed by the conveyance roller 8, passes a top sensor 9, and is conveyed to a transfer nip portion between the surface of the photosensitive drum 1 and the outer peripheral surface of the transfer roller 5. The recording material P onto which the toner image formed on the surface of the photosensitive drum 1 has been transferred is conveyed along a conveyance guide 10 to the fixing device C, where the toner image on the recording material P is heated and pressed to be thermally fixed on the recording material P. The recording material P on which the toner image T has been thermally fixed is conveyed by the conveyance roller 12 and a discharge roller 13 in this order and is discharged to a discharge tray 14 on the upper surface of the apparatus main body M. Untransferred toner remaining on the surface of the photosensitive drum 1 after the toner image has been transferred onto the recording material P is removed by a cleaning blade 64 of the cleaning device 6 and accumulated in the cleaning device 6. By repeating the above operations, sequential printing is performed. The image forming apparatus of Embodiment 1 can print at a printing speed of 70 sheets/min for A4 size. Although the details are omitted, the image forming apparatus of Embodiment 1 is provided with a reversing conveyance path that enables double-sided image formation, and the apparatus is configured so that the recording material P having an image formed on one side is returned to the upstream side of the image forming portion A by switchback caused by reverse rotation of the discharge roller 13.

Configuration of Fixing Device

Figure 2:
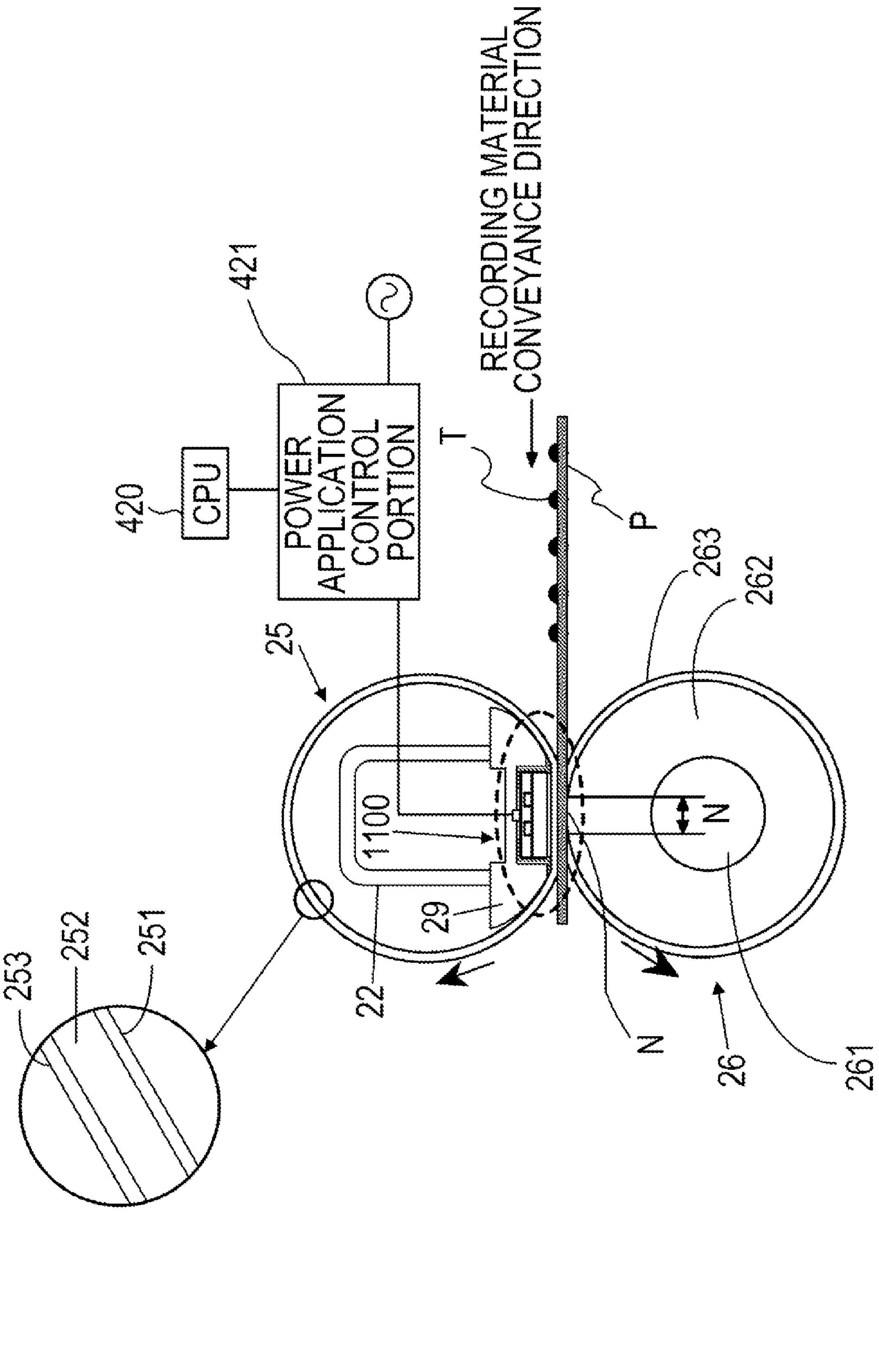
FIG. 2 is a cross-sectional side view of a fixing device according to Embodiment 1.

FIG. 2 is a schematic cross-sectional side view of the fixing device C as an image heating device according to Embodiment 1. The fixing device C of Embodiment 1 basically includes a heater 1100, a heater holder 29, a metal stay 22, a fixing film 25 as a tubular film that is a fixing member, and a pressure roller 26. The heater holder 29 is a holding member that holds (supports) the heater 1100 as a heating body inside the fixing film 25. In the fixing device C, the recording material P is nipped and the toner image T is thermally fixed to the recording material P by using the heat of the heater 1100 in a nip portion N between the tubular fixing film 25 as a heating rotating body and the pressure roller 26 as a pressing rotating body (pressure member). The nip portion N is formed by the heater 1100 and the pressure roller 26 with the fixing film 25 interposed therebetween. The recording material P is nipped and conveyed at the nip portion N by the rotation of the pressure roller 26 and the driven rotation of the fixing film 25. In the present embodiment, the heater 1100 is configured to be in direct contact with the inner surface of the fixing film 25, but a heat transfer member or the like may be interposed between the heater 1100 and the inner surface of the fixing film 25. Of the constituent members of the fixing device C according to the present embodiment, the members related to the formation of the nip portion N constitute a nip forming portion. A power application control portion 421 connected to a commercial AC power supply supplies power to the fixing device C according to a signal from the CPU 420.

Pressure Roller

The pressure roller 26 has an elastic layer 262 on the outer circumference of a core shaft portion 261 and has a surface layer 263 on the outer circumference of the elastic layer 262. The pressure roller 26 has an outer diameter of about 25 mm. A solid or hollow metal material such as aluminum or iron is used for the core shaft portion 261. In Embodiment 1, solid aluminum is used as the core metal material. The elastic layer 262 is composed of heat-resistant silicone rubber and made conductive by adding an electrically conductive material such as carbon. The surface layer 263 in contact with the outer surface of the fixing film 25 is a releasing tube having a thickness of 10 μm to 80 μm and made of a fluorine resin such as PFA, PTFE, FEP, and the like. Here, PFA stands for a tetrafluoroethylene/perfluoroalkyl vinyl ether copolymer, PTFE for polytetrafluoroethylene (tetrafluoro), and FEP for fluoroethylene/hexafluoropropylene copolymer (tetrafluoro/hexafluoro). The surface layer 263 is desirably made conductive from the viewpoint of preventing charge-up associated with the passage of paper. In Embodiment 1, the surface layer 263 of the pressure roller 26 was configured by adding carbon as a conductive material to a PFA tube having a thickness of 30 μm.

Fixing Film

The fixing film 25 has a cylindrical shape with a diameter of 24 mm. The fixing film 25 is flexible and loosely fitted on the heater holder 29. The layer structure of the fixing film 25 is composed of multiple layers including a base layer 251, an elastic layer 252, and a surface layer 253 from the inside, as in the cross-sectional configuration shown in the circle in FIG. 2. As a material for the base layer 251, a heat-resistant resin material with low heat capacity, such as a polyimide, a polyamideimide, PEEK, or PES, is generally used. Metal materials such as SUS may also be used. Since the base layer 251 needs to have a small heat capacity to satisfy the quick start property and at the same time to satisfy the mechanical strength, the thickness of 18 μm or more and 150 μm or less is desirable. The base layer 251 of Embodiment 1 was a cylindrical polyimide base layer with a thickness of 70 μm. The elastic layer 252 is made of an elastic material typified by silicone rubber. By providing the elastic layer 252, it is possible to wrap the toner image T and apply heat uniformly, so that it is possible to obtain a high-quality image without unevenness. Since the elastic layer 252 has low thermal conductivity with silicone rubber alone, a thermally conductive filler such as alumina, metallic silicon, silicon carbide, zinc oxide, or the like is added to impart high thermal conductivity. In a high-speed machine as in Embodiment 1, the amount of the thermally conductive filler to be added may be adjusted, as appropriate, to ensure 0.9 W/m·K or more. In Embodiment 1, alumina and metallic silicon are added as thermally conductive fillers to the rubber material of the elastic layer 252, and the thermal conductivity thereof is set to 1.5 W/m·K. Also, the thickness of the elastic layer 252 is set to 270 As a release layer, the surface layer 253 is required to have high toner releasability and high abrasion resistance. A fluororesin such as PFA, PTFE, and FEP is used as the material. The layer is formed of a coating layer obtained by baking a resin dispersion, or a tube layer. An additive such as carbon and an ion-conducting material may be added to the fluororesin to impart electrical conductivity. The surface layer 253 of Embodiment 1 was a tube layer having a thickness of 20 μm and using PFA as a fluororesin, with no conductive material being added thereto.

Heater Holder

The heater 1100 is held by the heater holder 29 made of a heat-resistant resin material such as a liquid crystal polymer. The heater holder 29 also has a guide function of guiding the rotation of the fixing film 25.

Heater

The heater 1100, which is a characteristic configuration of Embodiment 1, will be described with reference to FIGS. 3A to 3C. The heater 1100 has a ceramic substrate 1105 and a heating resistor (heating element) provided on the substrate 1105 and generating heat by application of electric power. A surface protective layer 1108 made of glass is provided on the surface (first surface) of the substrate 1105 that contacts the fixing film 25 on the nip portion N side in order to ensure slidability with the fixing film 25. A surface protective layer 1107 made of glass is provided on the surface (second surface) of the substrate 1105 opposite to the first surface on the nip portion N side to insulate the heating resistor. An electrode E14 is exposed on the second surface, and an electric contact C14 for power supply is in contact with the electrode to connect the heating resistor electrically to the AC power supply.

Figure 3A:
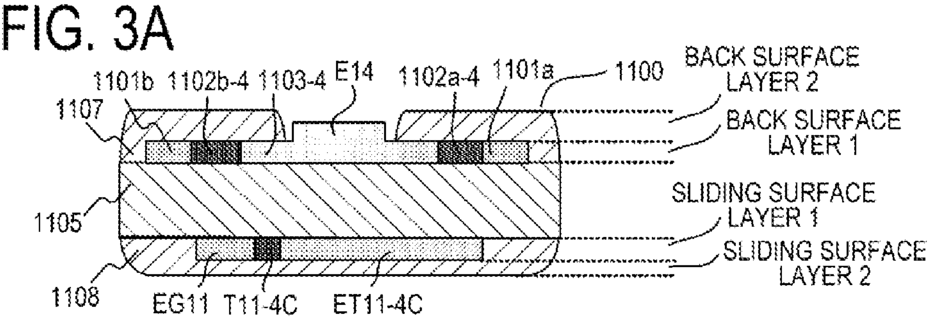
FIGS. 3A to 3C are schematic cross-sectional views of a heater according to Embodiment 1.
Figure 3B:
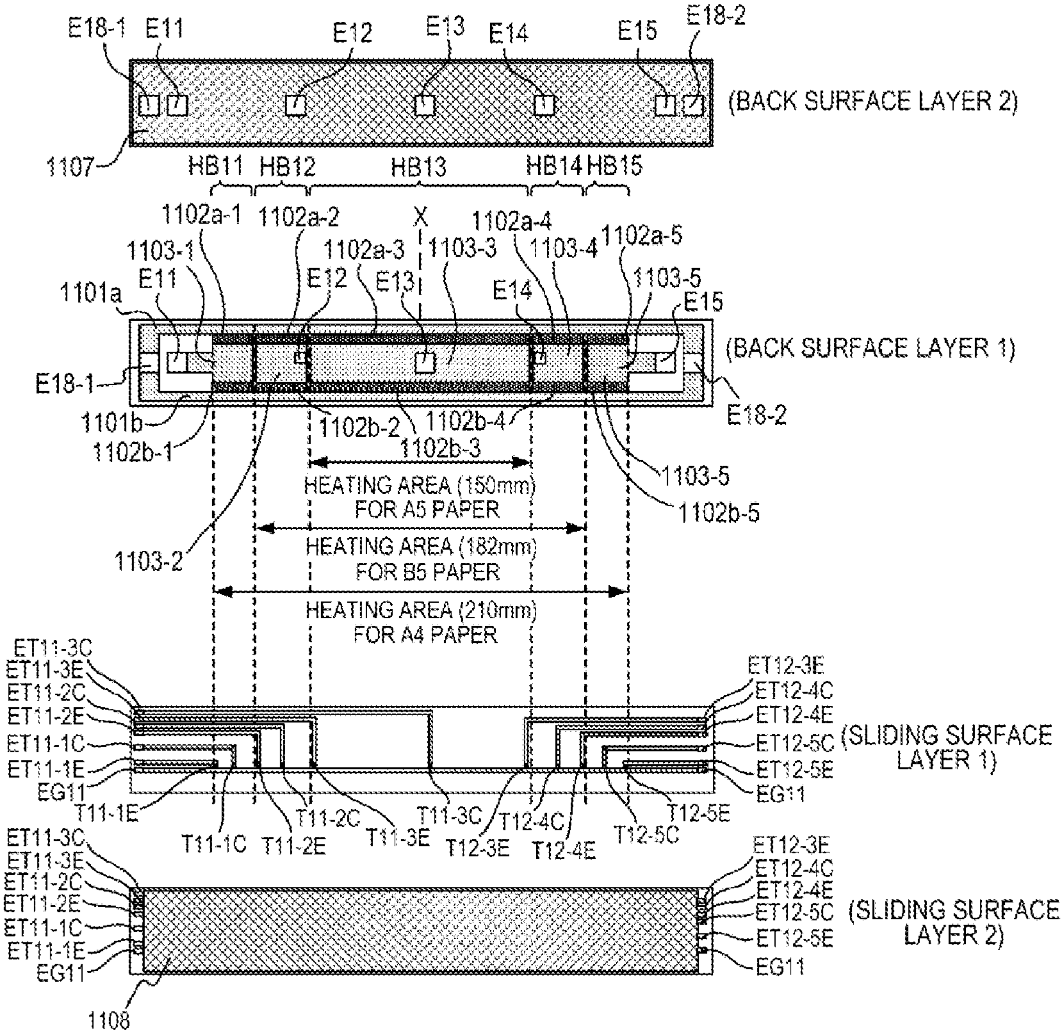

FIGS. 3A and 3B show the configuration of the heater 1100 of the present embodiment. FIG. 3A is a cross-sectional view of the heater 1100 at a conveyance reference position X of the recording material P shown in FIG. 3B. FIG. 3B is a schematic plan view of each layer of the heater 1100. FIG. 3C is a schematic plan view of the heater holder that holds the heater 1100. In the present embodiment, the conveyance reference position X is set at a substantially central position in the width direction of the recording material perpendicular to the conveyance direction of the recording material P in the fixing device C, but the set position is not limited to a specific position.

The heater 1100 is configured of the substrate 1105, a sliding surface layer 1 provided on the first surface side of the substrate 1105 that contacts the fixing film 25, a sliding surface layer 2 that covers the sliding surface layer 1, a back surface layer 1 provided on the second surface side of the substrate 1105 opposite to the first surface side, and a back surface layer 2 that covers the back surface layer 1. The heater 1100 has a plurality of heating blocks configured of a first conductor 1101, a second conductor 1103, and a heating element 1102 on the back surface layer 1 along the longitudinal direction. In the heater 1100 of the present embodiment, a total of five heating blocks HB11 to HB15 are formed by a plurality of heating elements 1102 arranged in the width direction (longitudinal direction of the substrate 1105) perpendicular to the recording material conveyance direction.

Figure 3C:
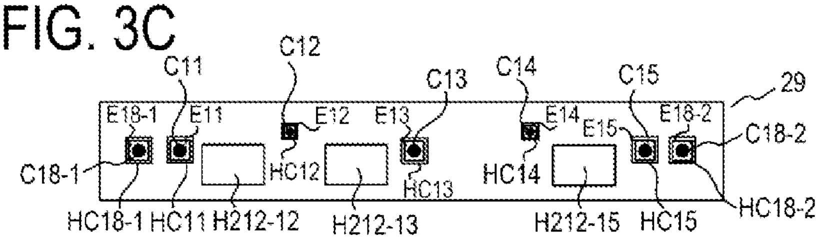

The heater 1100 shown in FIGS. 3A to 3C are divided into heating blocks HB11 to HB15 left-right symmetrically (symmetrically with respect to the conveyance reference position X) from the center of the heater 1100 in the longitudinal direction of the heater (width direction of the recording material perpendicular to the recording material conveyance direction). The division positions of the heating block HB correspond to "A5 size", "B5 size" and "A4 size", respectively. That is, the width of the heating block HB13 is 150 mm, which is substantially the same as the short side length of A5 size. The width of the heating blocks HB12 to HB14 is 182 mm, which is substantially the same as the short side length of B5 size. The width of the heating blocks HB11 to HB15 is 210 mm, which is substantially the same as the short side length of A4 size. Among these heating blocks HB, "the heating block HB13" is designated as a heating group 1, "the heating block HB12 and the heating block HB14" are designated as a heating group 2, and "the heating block HB11 and the heating block HB15" are designated as a heating group 3. Each heating group is powered by the same drive (common circuit).

The heating elements 1102 of each heating block are arranged while being divided into a heating element 1102*a* on the upstream side and a heating element 1102*b* on the downstream side in the recording material P passage direction in relation to the widthwise direction (direction perpendicular to the longitudinal direction) of the heater 1100. Also, the first conductor 1101 is divided into a conductor 1101*a* connected to the heating element 1102*a* and a conductor 1101*b* connected to the heating element 1102*b*.

The heater 1100 is divided into five heating blocks HB11 to HB15. That is, the heating element 1102*a* is divided into five heating elements 1102*a*-1 to 1102*a*-5. Similarly, the heating element 1102*b* is divided into five heating elements 1102*b*-1 to 1102*b*-5. Further, the second conductor 1103 is also divided into five conductors 1103-1 to 1103-5.

The back surface layer 2 of the heater 1100 is provided with an insulating surface protective layer 1107 that covers the heating elements 1102, the first conductors 1101 and the second conductors 1103. In Embodiment 1, glass is used as the surface protective layer 1107. The surface protective layer 1107 does not cover the electrodes E11 to E15, E18-1 and E18-2 with which the electric contacts C11 to C15, C18-1 and C18-2 for power supply are in contact. The electrodes E11 to E15 are for supplying power to the heating blocks HB11 to HB15 via the second conductors 1103-1 to 1103-5, respectively. The electrodes E18-1 and E18-2 are for supplying electric power to the heating blocks HB11 to HB15 via the first conductors 1101*a* and 1101*b*.

Where the electrodes are thus provided on the back surface of the heater 1100, it is not necessary to provide a conductive pattern for supplying power to the second conductors 1103-1 to 1103-5 on the substrate 1105, so that the width of the substrate 1105 in the widthwise direction can be reduced. As a result, an increase in the size of the heater 1100 can be suppressed. As shown in FIG. 3B, the electrodes E12 to E14 are arranged in the longitudinal direction of the substrate 1105 in the area where the heating elements are provided.

Although details will be described hereinbelow, various heat generation distributions can be formed in the heater 1100 of Embodiment 1 by independently controlling a plurality of heating blocks. A heat generation distribution corresponding to the size of the recording material P can thus be set. Furthermore, the heating elements 1102 are formed of a material having PTC (Positive Temperature Coefficient) properties. By doing so, even in the case where the end portion of the recording material P does not coincide with the boundary of the heating block, it is possible to suppress the temperature rise in the non-paper-passing portion.

A plurality of thermistors (temperature detection elements) for detecting the temperature of each of the heating blocks HB11 to HB15 is formed on the sliding surface layer 1 on the sliding surface side (the surface that contacts the fixing film 25) of the heater 1100. The plurality of thermistors are indicated by T11-1C to T11-3C, T11-1E to T11-3E, T12-4C to T12-5C, and T12-3E to T12-7E, respectively, in FIG. 3B. The thermistor material may be any material that has a high positive or negative value of TCR (Temperature Coefficient of Resistance). In Embodiment 1, the thermistor was configured by thinly printing a material having NTC (Negative Temperature Coefficient) on the substrate 1105.

The thermistor arrangement for each heating block HB will be explained hereinbelow. In Embodiment 1, as shown in FIG. 3B, two or more thermistors are arranged in all of the heating blocks HB11 to HB15. For example, two thermistors T11-2C and T11-2E are installed for the heating block HB12 to obtain a configuration in which the respective temperature can be detected by conductive patterns ET11-2C and ET11-2E for resistance value detection and a common conductive pattern EG11. The thermistor T11-2C is a main thermistor for detecting the temperature of the central area of the heating block HB12, and is arranged substantially at the center of the heating block HB12 in the width direction of the recording material P. The thermistor T11-2E is an end portion thermistor for detecting the temperature of the end portion area of the heating block HB12, and is arranged in the area of the heating block HB12 and on the side adjacent to the heating block HB11 in the width direction of the recording material P. In this way, main thermistors T11-1C, T11-2C, T11-3C, T12-4C, and T12-5C for detecting the temperature of the central area are arranged for each of the heating blocks HB11 to HB15. Further, end portion thermistors T11-1E, T11-2E, T11-3E, T12-3E, T12-4E, and T12-5E for detecting the temperature of the end portion areas are arranged for each of the heating blocks HB11 to HB15.

The heater holder 29 will be described with reference to FIG. 3C. The heater holder of the present embodiment is provided with opening portions HC11 to HC15, HC18-1 and HC18-2 for supplying power to the electrodes E11 to E15, E18-1 and E18-2 provided on the back surface layer 1 of the heater 1100. Electrical contacts C11 to C15, C18-1 and C18-2 as power supply portions supply power to the electrodes through the opening portions HC11 to HC15, HC18-1 and HC18-2. The heater holder 29 is also provided with opening portions H212-12, H212-13, and H212-15 for installing thermoswitches 50, which will be described hereinbelow.

Power Application Control Circuit for Heater

Figure 4:
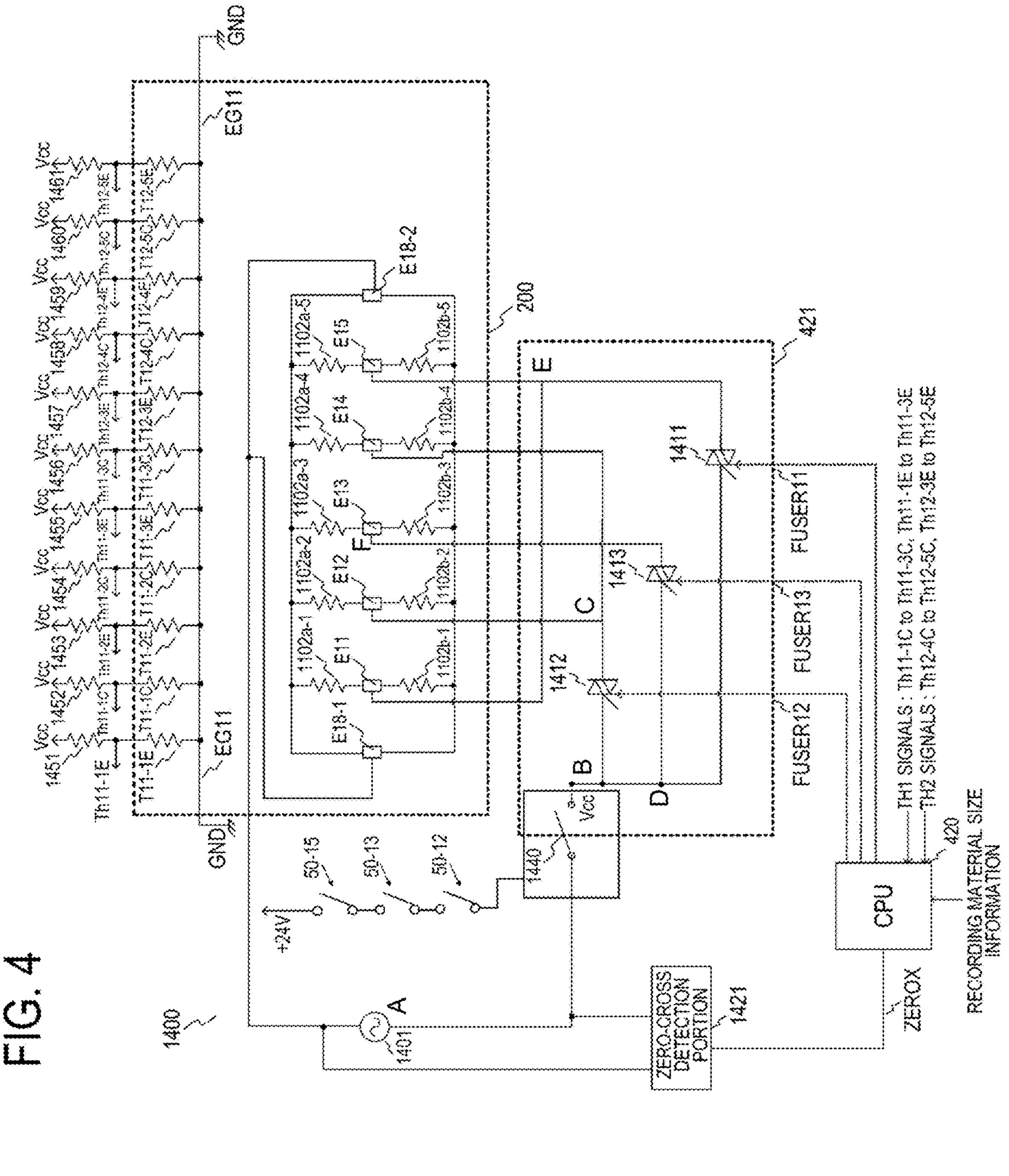
FIG. 4 is an electric circuit diagram according to Embodiment 1.

FIG. 4 is a circuit diagram of a control circuit 1400 that controls the heater 1100. Power control (power application control) for the heater 1100 is performed by conducting/interrupting power supply to the heater 1100 by triacs 1411 to 1413. The triacs 1411 to 1413 operate according to FUSER11 to FUSER13 signals from a CPU 420, respectively. The control circuit 1400 of the heater 1100 has a circuit configuration capable of applying power to the five heating blocks HB11 to HB15 by three triacs 1411 to 1413. Specifically, the triac 1411 performs power application control of the heating block HB11 and the heating block HB15 (heating group 3). In addition, the triac 1412 performs power application control of the heating block HB12 and the heating block HB14 (heating group 2). In addition, the triac 1413 performs power application control of the heating block HB13 (heating group 1) as a reference heating element group. At this time, the heating group 2 as the first heating element group and the heating group 3 as the second heating element group each have a plurality of heating blocks HB in one drive circuit. As shown in FIG. 4, power is supplied to each of the heating elements included in the group via one respective common drive circuit (first common circuit, second common circuit). With respect to the reference points A-F in FIG. 4, Segment A-B is a common circuit for all heating elements, Segment B-C is a common circuit for the 1st heating element group, Segment D-E is a common circuit for the 2nd heating element group, and Segment D-F is a circuit for the central heating element. In FIG. 4, drive circuits for the triacs 1411 to 1413 are omitted.

A zero-cross detection portion 1421 is a circuit that detects a zero-cross of an AC power supply 1401 and outputs a ZeroX signal to the CPU 420. The ZeroX signal is used as a reference signal or the like for phase-controlling the triacs 1411 to 1413.

Heater Temperature Detection Method

A method for detecting the temperature of the heater 1100 will be described hereinbelow. Signals (Th11-1C to Th11-3C, Th11-1E to Th11-3E, Th12-4C to Th12-5C, and Th12-3E to Th12-5E) obtained by dividing a voltage Vcc by the resistance value of the thermistors and the resistance values of resistors 1451 to 1461 are input to the CPU 420. In FIG. 4, the thermistors are denoted by T11-1C to T11-3C, T11-1E to T11-3E, T12-4C to T12-5C, and T12-3E to T12-5E. For example, the signal Th11-3C is obtained by dividing the voltage Vcc by the resistance value of the thermistor T11-3C and the resistance value of the resistor 1456. Since the thermistor T11-3C has a resistance value corresponding to the temperature, the level of the signal Th11-3C input to the CPU 420 also changes when the temperature of the heating block HB13 changes. The CPU 420 converts each input signal into a temperature corresponding to the level thereof.

The CPU 420 calculates the electric power to be supplied to the heater, for example, by PI control on the basis of the set temperature (control target temperature) of each heating block and the detected temperature (output) of each thermistor. Furthermore, the calculated supply power is converted into control timings such as corresponding phase angles (phase control) and fractions (fraction control), and the triacs 1411 to 1413 are controlled at these control timings. Processing of signals corresponding to other thermistors is the same, so the description thereof is omitted.

Heater Power Control

The power control of the heater 1100 (heater temperature control) will be described hereinbelow. During the fixing process, each of the heating blocks HB11 to HB15 is controlled so that the temperature detected by the thermistors is maintained at the set temperature (control target temperature). Specifically, the power supplied to the heating block HB14 is determined by controlling the driving of the triac 1414 so that the temperature detected by the thermistor T11-4C is maintained at the set temperature. Thus, each thermistor is used when performing control for keeping each heating block HB at a constant temperature.

Heater Protection

A relay 1440 is provided as a means for cutting off power to the heater 1100 when the temperature of the heater 1100 rises excessively due to factors such as device failure. Also, three thermoswitches 50-12, 50-13, and 50-15 are on the DC circuit connected to the 24 V power supply. In this configuration, where any one of the three thermoswitches 50-12, 50-13, and 50-15 is opened, the 24 V applied to the relay 1440 is cut off, the relay 1440 is opened, and the AC circuit is cut off Thermoswitch The safety element, which is a characteristic configuration of Embodiment 1, will be explained hereinbelow. The safety element is installed for the purpose of safely shutting off the power input to the heater 1100 without damaging the heater 1100 or the like even when the CPU 420 cannot perform control and the heater 1100 runs out of control. In the present embodiment, a case where a thermoswitch is used as a safety element will be described, but other elements such as a thermostat and a thermal fuse may be used as the element that detects abnormal heat generation of the heater and cuts off the power supply to the heater.

Figure 5A:
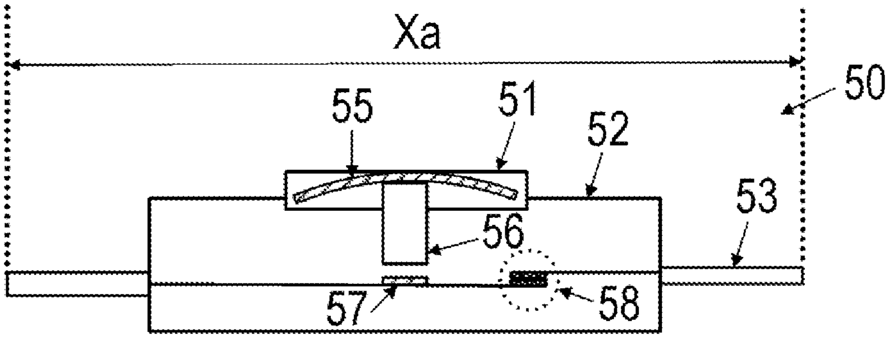
FIGS. 5A to 5C are schematic cross-sectional views of a thermoswitch according to Embodiment 1.
Figure 5B:
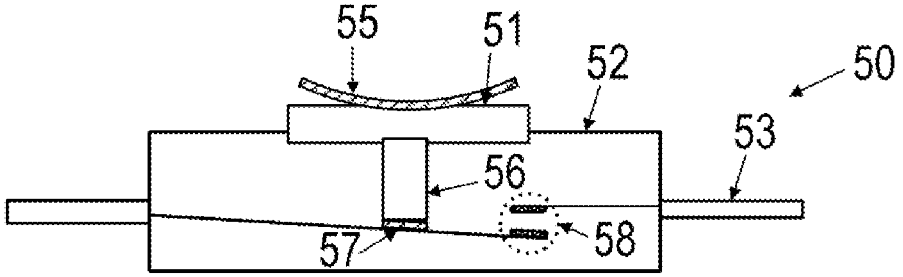
Figure 5C:
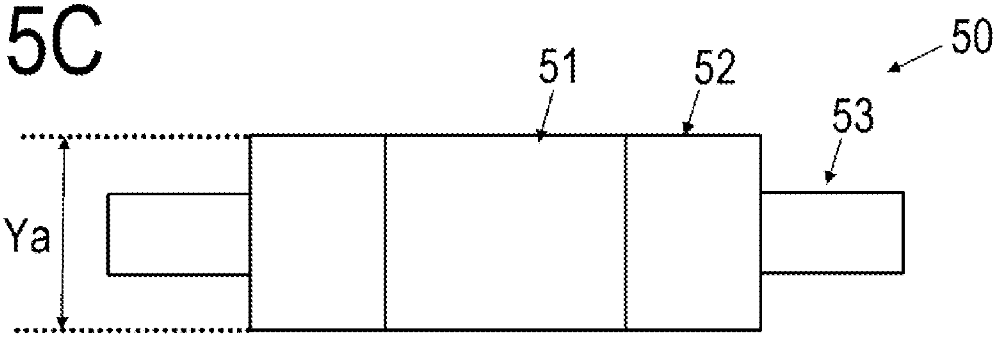

The operation of the thermoswitch 50 (50-12, 50-13, and 50-15) will be described with reference to FIGS. 5A to 5C. FIGS. 5A to 5C illustrate schematic configurations of the thermoswitch 50 used as a safety element in Embodiment 1. FIG. 5A is a schematic diagram showing a cross section of the thermoswitch 50 perpendicular to the plane of the heater 1100 and along the longitudinal direction of the heater 1100 in a state where the thermoswitch 50 is not in operation, that is, the circuit is connected. FIG. 5B is a schematic cross-sectional view (similar to FIG. 5A) of the thermoswitch 50 in a state where the predetermined temperature has been exceeded and the thermoswitch 50 operated, that is, in a state where the circuit has been disconnected. FIG. 5C is a plan view of the thermoswitch 50.

As shown in FIG. 5A, the thermoswitch 50 is composed of a heat-sensitive portion 51 that senses the temperature of the heater 1100 or the like, a ceramic body 52, and a connector terminal 53. A bimetal 55, a metal rod 56, a movable contact 57 and a contact portion 58 are arranged inside the heat-sensitive portion 51. The bimetal 55 is formed by bonding two metal plates with different coefficients of thermal expansion into a curved shape and has a property of deforming into a curved shape in the opposite direction when the temperature of the bimetal 55 exceeds a predetermined value. The thermoswitch 50 is connected through a connector terminal 53 to the drive circuit of the heating group in which the thermoswitch is installed. Connector terminals are provided at both longitudinal ends of the ceramic body 52 (both ends in the longitudinal direction of the heater).

As shown in FIG. 5B, when the temperature of the location in the heater 1100 where the thermoswitch 50 is installed exceeds a predetermined temperature, the bimetal 55 deforms into a shape curved in the opposite direction. This deformation of the bimetal 55 pushes down the metal rod 56 and further pushes down the movable contact 57. As a result, the contact portion 58 separates and the circuit is disconnected. The thermoswitch 50 used in Embodiment 1 has a size of Xa×Ya: 36 mm×8 mm, which is widely used.

Comparative Example

A heater according to a comparative example will be described with reference to FIGS. 7A and 7B.

Figure 7A:
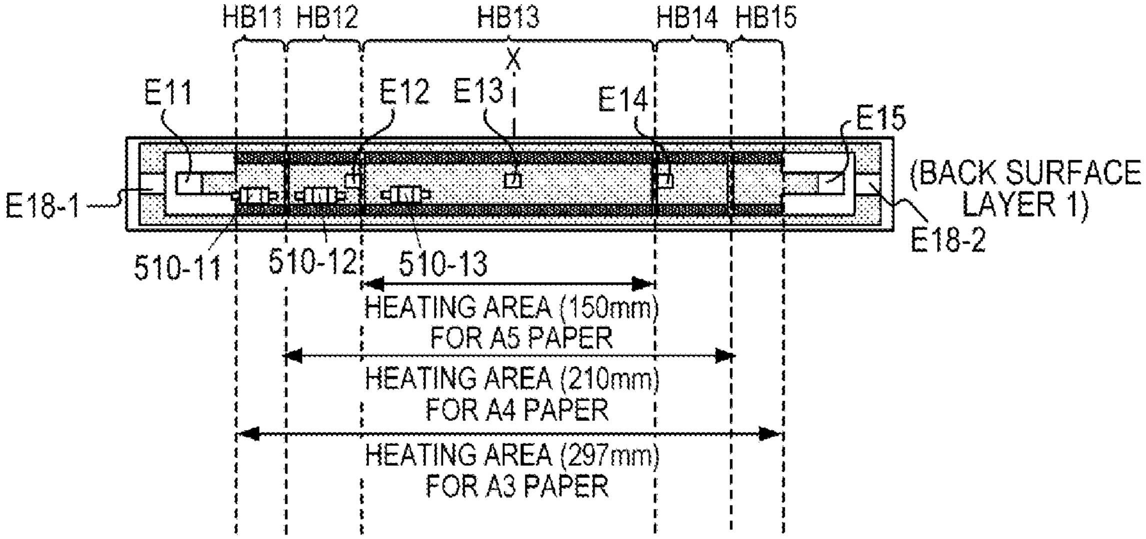
FIGS. 7A and 7B are schematic plan views of a heater and a thermoswitch according to a comparative example.

FIG. 7A is a plan view of a heater according to Comparative Example 1, explaining the configuration of the heater and the installation position of thermoswitches according to Comparative Example 1. The heater according to Comparative Example 1 is a heater to be used in a fixing device with a maximum print width of A3 size, and this heater is configured to have a longitudinal width wider than that of the heater according to the present embodiment, which is used in a fixing device with a maximum print width of A4 size.

In the split heater according to Comparative Example 1 shown in FIG. 7A, the heater is divided into the heating blocks HB11 to HB15 left-right symmetrically from the longitudinal center of the heater (conveyance reference position). The division positions of the heating blocks HB11 to HB15 correspond to "A5 size", "A4 size", and "A3 size". That is, the width of the heating block HB13 is 150 mm, which is substantially the same as the short side length of A5 size. Further, the width of the heating blocks HB12 to HB14 is 210 mm, which is substantially the same as the short side length of A4 size. Furthermore, the width of the heating blocks HB11 to HB15 is 297 mm, which is substantially the same as the short side length of A3 size. Further, among these heating blocks HB11 to HB15, "heating block HB13=heating group 1", "heating block HB12 and heating block HB14=heating group 2", and "heating block HB11 and heating block HB15=heating group 3", and each group is powered by the same drive circuit (common circuit).

Thermoswitches 510-11, 510-12, and 510-13 have the same configuration as the thermoswitch 50 according to the present embodiment shown in FIGS. 5A to 5C.

From the viewpoint of safety, it is desirable to install the thermoswitches 510-11, 510-12, and 510-13 each in one of the heating blocks HB belonging to the heating group powered by the same drive. As an example of the installation configuration, as shown in FIG. 7A, a configuration can be considered in which thermoswitches 510-11, 510-12, and 510-13 are installed in the heating block HB11, the heating block HB12, and the heating block HB13, respectively. That is, in this configuration all the thermoswitches are installed in the heating blocks HB located on one longitudinal side with respect to the conveyance reference position which is the center of the paper width.

In the heater of Comparative Example 1, which is used in a fixing device with a maximum print width of A3 size, all the thermoswitches can be installed in the heating blocks HB on one longitudinal side with respect to the conveyance reference position in order to ensure a sufficient width of the heating blocks HB. However, in a heater having a heating block HB with a small width, such as the heater according to the present embodiment, it may be difficult to install the thermoswitches due to space considerations.

Figure 7B:
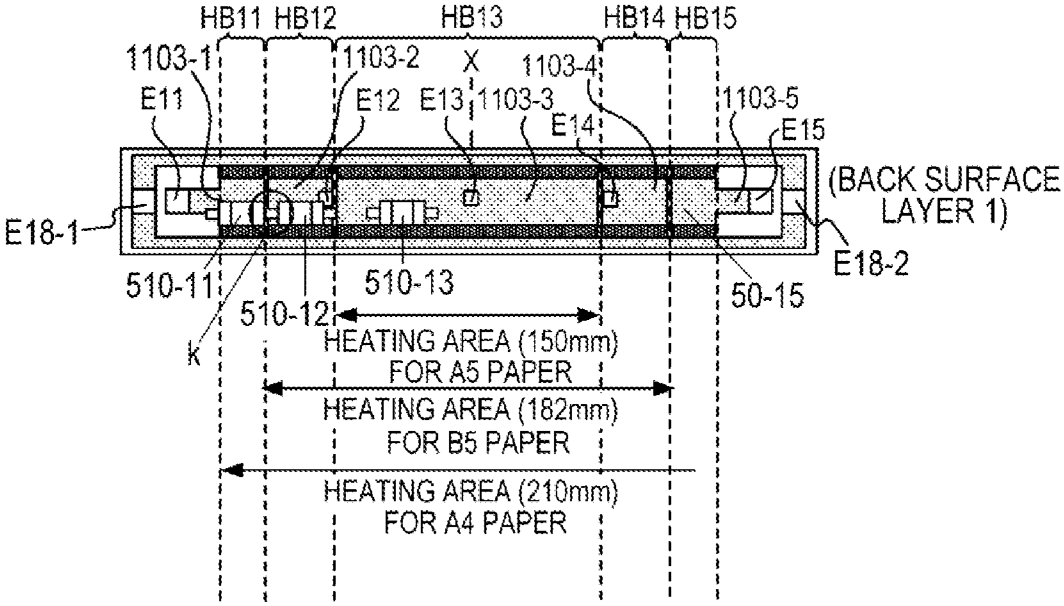

FIG. 7B is a plan view of a heater according to Comparative Example 2 for explaining the configuration of the heater and the thermoswitch installation positions according to Comparative Example 2. The heater according to Comparative Example 2, like the heater according to the present embodiment, is to be used in a fixing device having a maximum print width of A4 size, and this heater is configured to have a longitudinal width of the heating blocks HB narrower than that of the heater according to Comparative Example 1.

As shown in FIG. 7B, in the heater according to Comparative Example 2, the splitting positions of the heating blocks HB correspond to "A5 size", "B5 size", and "A4 size" in the same way as in the heater according to the present embodiment. That is, the width of the heating block HB13 is 150 mm, which is substantially the same as the short side length of A5 size. Further, the width of the heating blocks HB12 to HB14 is 182 mm, which is substantially the same as the short side length of B5 size. Furthermore, the width of the heating blocks HB11 to HB15 is 210 mm, which is substantially the same as the short side length of A4 size. Further, among these heating blocks HB11 to HB15, "heating block HB13=heating group 1", "heating block HB12 and heating block HB14=heating group 2", and "heating block HB11 and heating block HB15=heating group 3", and each group is powered by the same drive circuit (common circuit).

The thermoswitches 510-11, 510-12, and 510-13 have the same configuration as the thermoswitch 50 according to the present embodiment shown in FIGS. 5A to 5C.

The arrangement of the thermoswitches in the heater according to Comparative Example 2 is similar to that of the heater according to Comparative Example 1 in that all the thermoswitches are installed in the heating blocks HB located on one longitudinal side with respect to the conveyance reference position which is the center of the paper width. That is, in this configuration, thermoswitches 510-11, 510-12, and 510-13 are installed in the heating block HB11, the heating block HB12, and the heating block HB13, respectively. Here, the longitudinal widths of the heating block HB11 and the heating block HB12 in the heater according to Comparative Example 2 are narrower than the longitudinal widths of the heating block HB11 and the heating block HB12 in the heater according to Comparative Example 1.

Therefore, as shown in FIG. 7B, the thermoswitch 510-11 installed in the heating block HB11 and the thermoswitch 510-12 installed in the heating block HB12 interfere with each other in the longitudinal direction of the heater at k in the figure. Since the thermoswitch has connector terminals at both longitudinal ends, a certain amount of space is required in the longitudinal direction as an installation space. Therefore, in a heater configuration in which each heating block HB has a narrow longitudinal width, as in Comparative Example 2, the installation space for adjacent heating thermoswitches becomes cramped, making it difficult to arrange the thermoswitches.

Although a comparison between the fixing device with a maximum print width of A4 size and the fixing device with a maximum print width of A3 size is shown here, similar problems occur in other configurations as well. For example, the same problem occurs in a fixing device in which the maximum print size remains A3 and the heating block HB is split into more section to support a large number of paper sizes.

Installation Positions of Thermoswitches in Embodiment 1

Figure 6:
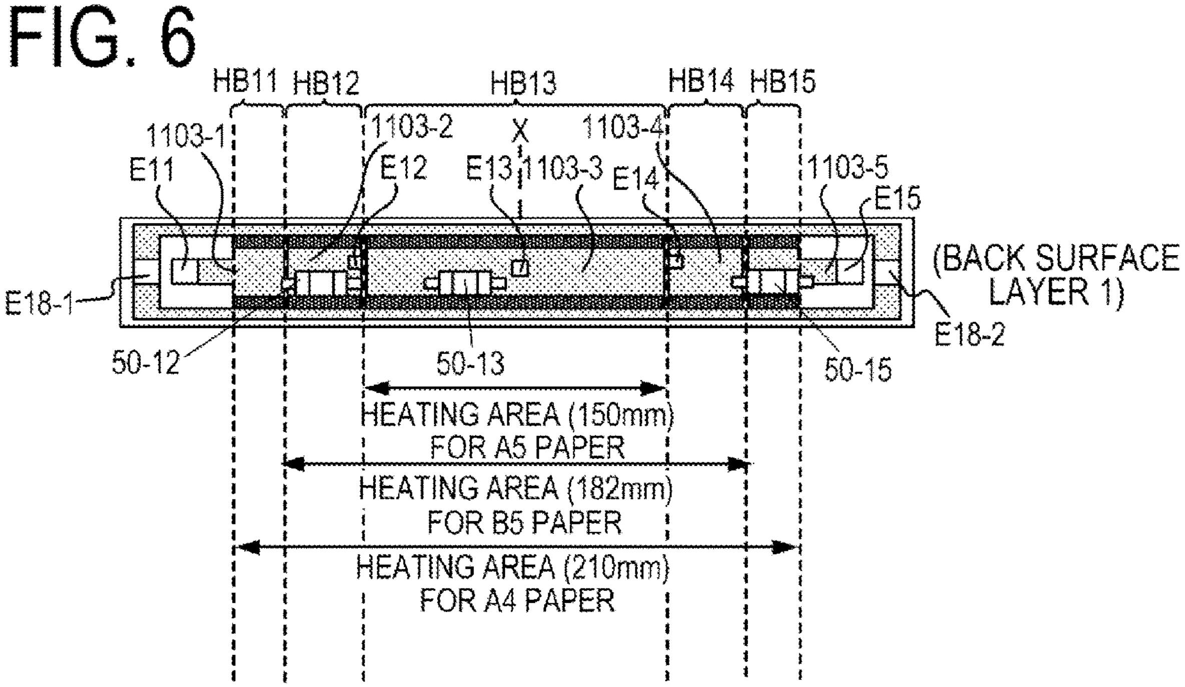
FIG. 6 is a schematic plan view of a heater and a thermoswitch according to Embodiment 1

FIG. 6 shows the installation positions of the thermoswitches 50 of Embodiment 1. In Embodiment 1, the thermoswitches 50 were installed so as not to be adjacent to each other in the left-right direction with respect to the center (conveyance reference position) X in the width direction of the recording material P in relation to the adjacent heating groups including a plurality of heating blocks HB. That is, in Embodiment 1, thermoswitches 50-12, 50-13, and 50-15 were installed in the heating blocks HB12, HB13, and HB15, respectively. By doing so, the thermoswitches 50-12, 50-13, and 50-15 can be installed without interfering with each other, and the thermoswitch 50 can be arranged for each drive circuit.

In Embodiment 1, the installation positions of the thermoswitches 50 are in the three heating blocks HB12, HB13, and HB15, but configuration examples in which the thermoswitches 50 are installed so as not to be adjacent to each other in the heating group including a plurality of heating blocks HB are not limited to this. For example, the combination of heating blocks in which the thermoswitches 50 are installed may be the heating blocks HB11, HB13, and HB14.

Modification Example

In the present embodiment, an example of the heater 1100 in which the heating element 1102*a* and the heating element 1102*b* are separately provided in the conveyance direction of the recording material P has been described, but the shape of the heating elements does not matter as long as the heater is split into heating blocks HB in the width direction of the recording material P. In addition, the configuration in which the electrodes E11 to E15, E18-1 and E18-2 are formed on the back surface of the recording material passing area of the heater 1100 is exemplified in Embodiment 1, but a configuration in which end electrodes are formed as in the modification example shown in FIG. 8A may be employed as well.

Figure 8A:
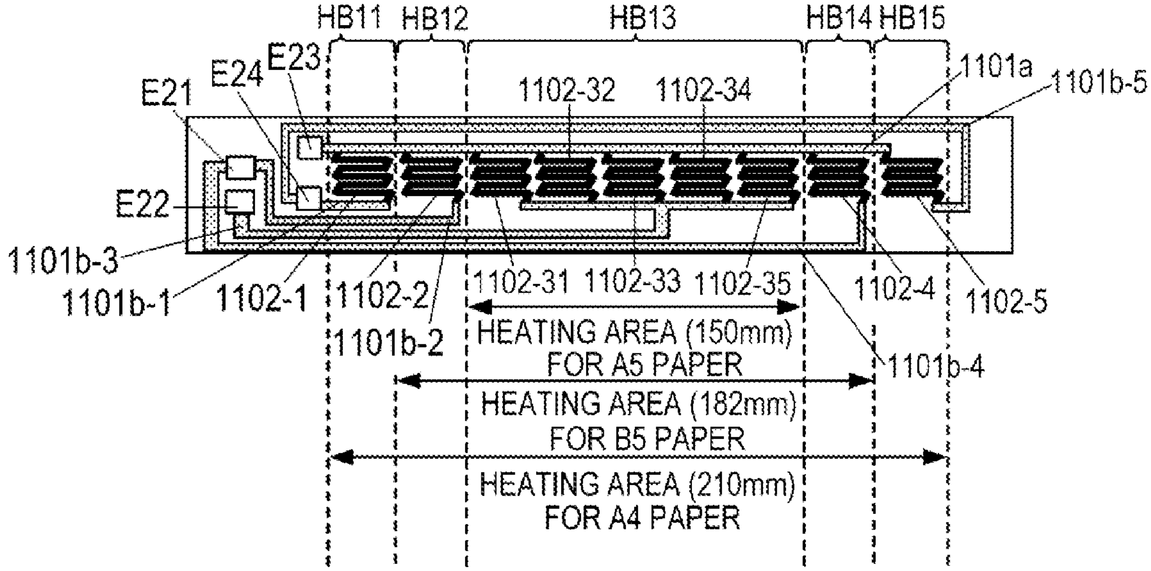
FIGS. 8A and 8B are schematic plan views of a heater according to a modification example of Embodiment 1.
Figure 8B:
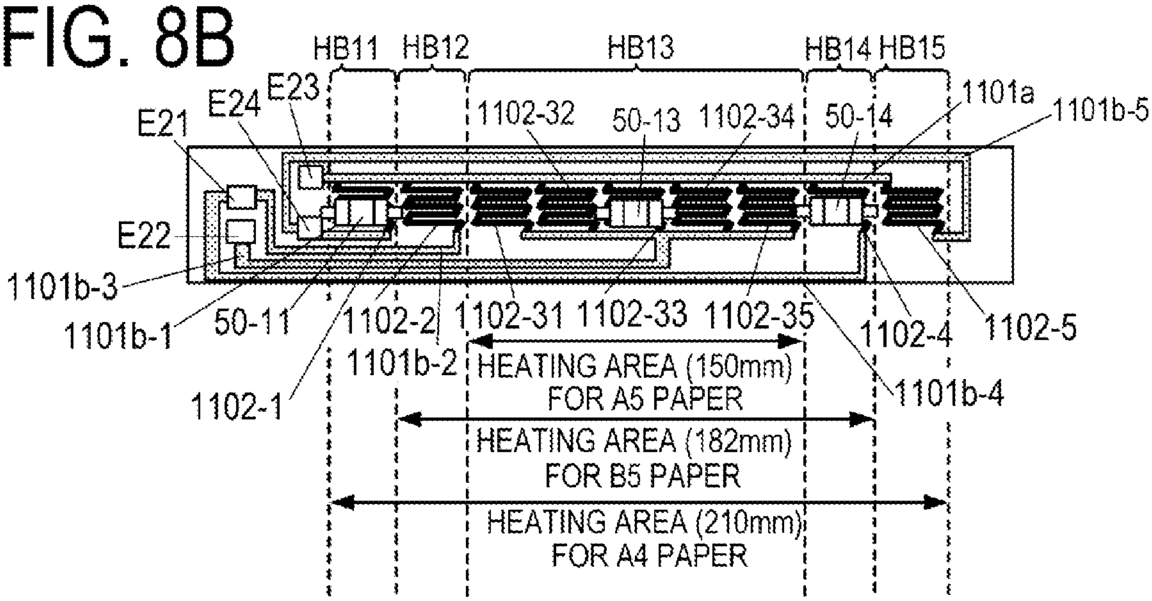

FIGS. 8A and 8B show the configuration of the heater according to the modification example. The heating area of the heater 1100-1 in FIG. 8A is divided into five heating blocks HB11 to HB15. Correspondingly, heating elements 1102-1, 1102-2, 1102-31, 1102-32, 1102-33, 1102-34, 1102-35, 1102-4, and 1102-5 are arranged. The heating blocks HB are divided into three heating groups for each drive circuit: a heating group 1 (heating block HB13), a heating group 2 (heating blocks HB12 and HB14), and a heating group 3 (heating blocks HB11 and HB15). The heating group 1 is a heating area including a reference position of the recording material P, and includes five heating elements 1102-31, 1102-32, 1102-33, 1102-34, and 1102-35 as a reference heating element group. The heating group 2 has heating blocks HB12 and HB14 installed separately on the left and right sides with the reference position of the recording material P interposed therebetween, and the heating blocks are installed so as to be adjacent to the heating group 1 on both longitudinal sides. The heating group 2 as the first heating element group includes two heating elements 1102-2 and 1102-4. The heating group 3 has heating blocks HB11 and HB15 installed separately on the left and right sides with the recording material P reference position interposed therebetween, and the heating blocks are installed so as to be adjacent to the heating group 2 on the sides away from the recording material P reference position. The heating group 3 as a second heating element group includes two heating elements 1102-1 and 1102-5.

Further, the heating elements 1102-1 to 1102-5 have a shape folded multiple times in the width direction of the heater 1100-1, as shown in FIG. 8A. In addition, the heating elements 1102-1 to 1102-5 generate heat by being supplied with electric power from the electrodes E21 to E24 via the conductors 1101*a* and 1101*b*-1 to 1101*b*-5.

Thermoswitches 50-11, 50-13, and 50-14 are installed at the positions shown in FIG. 8B with respect to the heater 1100-1. That is, the thermoswitch 50-11 is installed in the area of the heating block HB11, the thermoswitch 50-13 is installed in the heating block HB13, and the thermoswitch 50-14 is installed in the heating block HB14. By doing so, an effect similar to that of Embodiment 1 can be obtained.

Further, in this modification example, as in Embodiment 1, the heating blocks HB12, HB13, and HB15 can be set as a combination of heating blocks in which the thermoswitches are installed.

Figure 11:
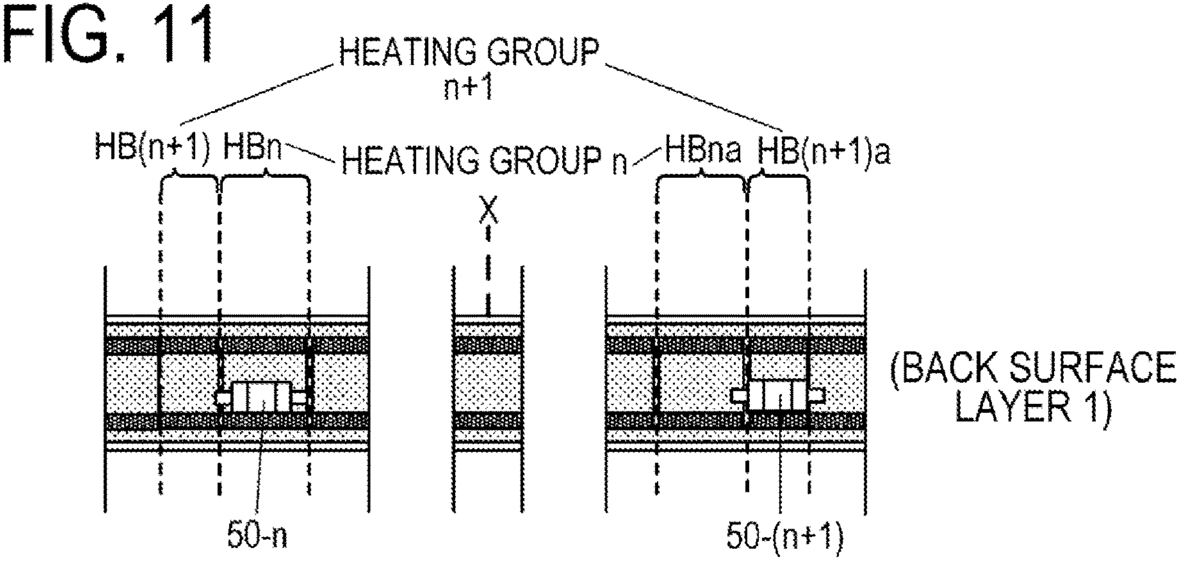
FIG. 11 is a schematic plan view of a heater according to Embodiment 1.

Also, in the present embodiment, the case in which the heating group is divided into three has been described, but the same effect can be exhibited even in a fixing device in which the heating area is split into larger number of sections. An example is shown in FIG. 11. According to FIG. 11, the heating group n is composed of a heating block HBn and a heating block HBna to which power is supplied by the same drive, and the heating block HBn and the heating block HBna are arranged separately on the left and right sides with the conveyance reference position X of the recording material P interposed therebetween. Here, n for the heating block HB indicates the number of the position at which the heating block HB is arranged on one side (left side) in the width direction of the heater with respect to the heating block HB including the conveyance reference position X. Further, na for the heating block HB indicates the number of the position at which the heating block HB is arranged on the other side (right side) in the width direction of the heater with respect to the heating block HB including the conveyance reference position X. The heating group n+1 is composed of a heating block HB(n+1) and a heating block HB(n+1) a to which power is supplied by the same drive. The heating block HB(n+1) and the heating block HB(n+1) a are arranged separately on the left and right sides with the conveyance reference position X of the recording material P interposed therebetween. Further, the heating group n+1 is installed adjacent to the heating group n in the direction away from the conveyance reference position X of the recording material P. At this time, the thermoswitches 50 are installed at the positions shown in FIG. 11. That is, the thermoswitch 50-*n* is installed in the heating block HBn, and the thermoswitch 50-(*n*+1) is installed in the heating block HB(n+1)a. By doing so, even in a fixing device using the heater 1100 split into multiple sections, the thermoswitches 50 can be arranged for each drive circuit without being restricted by the device layout, and problems of productivity improvement in the case of small-size paper can be solved.

Furthermore, in Embodiment 1, the heat-sensitive portion 51 of the thermoswitch 50 is arranged so as to contact the heating element 1100, but such contact is not necessary, provided that the heat-sensitive portion can be arranged at a position making it possible to detect the temperature of the area of the heating block HB (to react to excessive temperature rise). For example, it is possible to insert a resin material or the like between the heater 1100 and the heat-sensitive portion 51.

Embodiment 2

The fixing device according to Embodiment 2 of the present invention is configured as a fixing device operating at a low printing speed, but capable handing a finer paper size.

In the fixing device according to Embodiment 2, the maximum recording material width that can pass is the LTR size (216 mm), and the heating block HB is split into seven heating blocks. Also, as a safety element, a thermal fuse 60 smaller than the thermoswitch 50 used in Embodiment 1 is used. The difference between Embodiment 2 and Embodiment 1 is only in the heater 1200 and the safety element (thermal fuse 60). The rest of the configuration is the same as that of Embodiment 1, and therefore the description thereof is omitted.

Figure 9A:
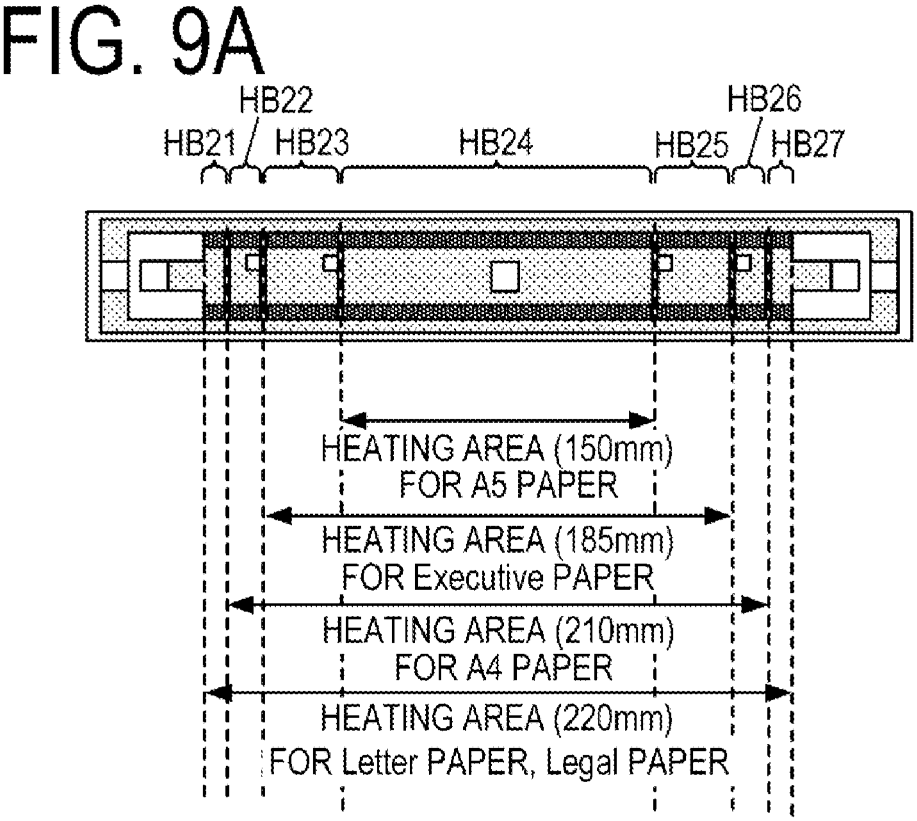
FIGS. 9A and 9B are schematic plan views of a heater and a thermal fuse according to Embodiment 2.

The configuration of the heater 1200 of Embodiment 2 will be described with reference to FIGS. 9A and 9B. In the heater 1100 of Embodiment 2, the heating block HB is divided into seven heating blocks HB21 to HB27. The heating block HB24 corresponds to A5 size (150 mm). The heating block HB23 and the heating block HB25 correspond to the Executive size (185 mm). The heating block HB22 and the heating block HB26 correspond to A4 size (210 mm). The heating block HB11 and the heating block 17 correspond to the LTR size (216 mm).

As with the heater of Embodiment 1, the heater of Embodiment 2 is also divided into heating groups for each heating block HB having a common drive circuit. A heating group 1 as a reference heating element group is composed of a heating block HB14. A heating group 2 as a first heating element group is composed of heating blocks HB13 and HB15. A heating group 3 as a second heating element group is composed of heating blocks HB12 and HB16. A heating group 4 as a third heating element group is composed of heating blocks HB11 and HB17.

Figure 10A:
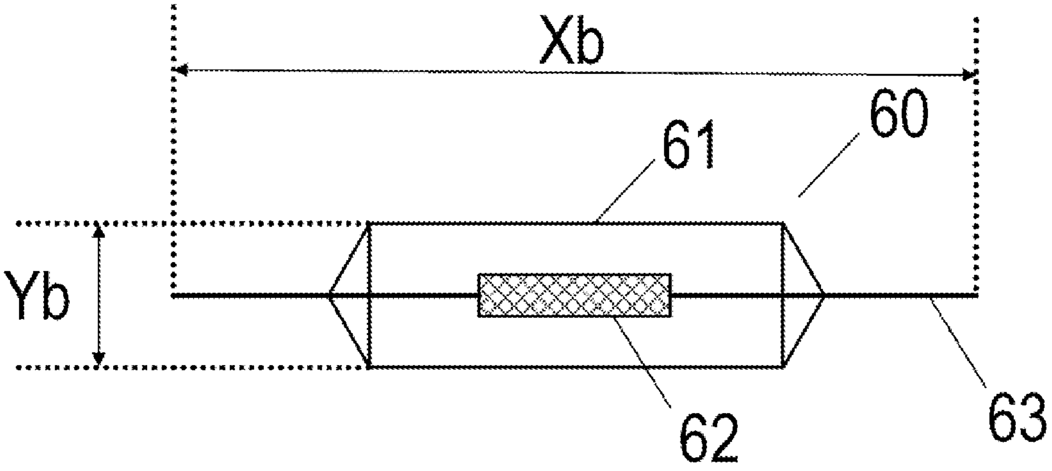
FIGS. 10A and 10B are schematic plan views of the thermal fuse 60 according to Embodiment 2.
Figure 10B:
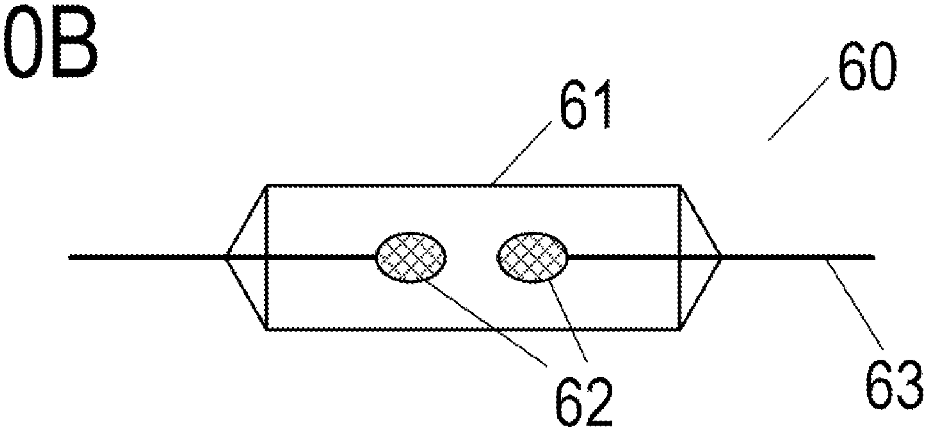

A thermal fuse 60, which is a safety element used in Embodiment 2, will be described with reference to FIGS. 10A and 10B. FIGS. 10A and 10B are schematic cross-sectional views showing a schematic configuration of the thermal fuse 60. As shown in FIG. 10A, the thermal fuse 60 includes a resin cover 61, a heat-sensitive fusible body 62 and a lead wires 63. FIG. 10B is a schematic cross-sectional view taken when the thermal fuse 60 operates. When the thermal fuse 60 is exposed to a temperature equal to or higher than a predetermined temperature, the heat-sensitive fusible body 62 is melted and the circuit is disconnected, as shown in FIG. 10B. The thermal fuse 60 is connected via the lead wires 63 to a drive circuit of the heating group in which the thermal fuse is installed. The lead wires 63 are provided at both longitudinal ends of the resin cover 61 (both ends in the width direction of the heater). The thermal fuse 60 used in Embodiment 2 has a size of Xb×Yb: 15 mm×5 mm, which is widely used.

It is desirable that the thermal fuse 60 have a certain size or larger in order to stably function at a low cost. Specifically, it is desirable that the width indicated by Xb in FIG. 10A be 15 mm or more. Moreover, as a feature of the thermal fuse 60, the predetermined operating temperature cannot be set to a high temperature. Therefore, Embodiment 2 shows a configuration suitable for a fixing device provided in a low-speed image forming apparatus that does not require operation at relatively high temperatures.

Figure 9B:
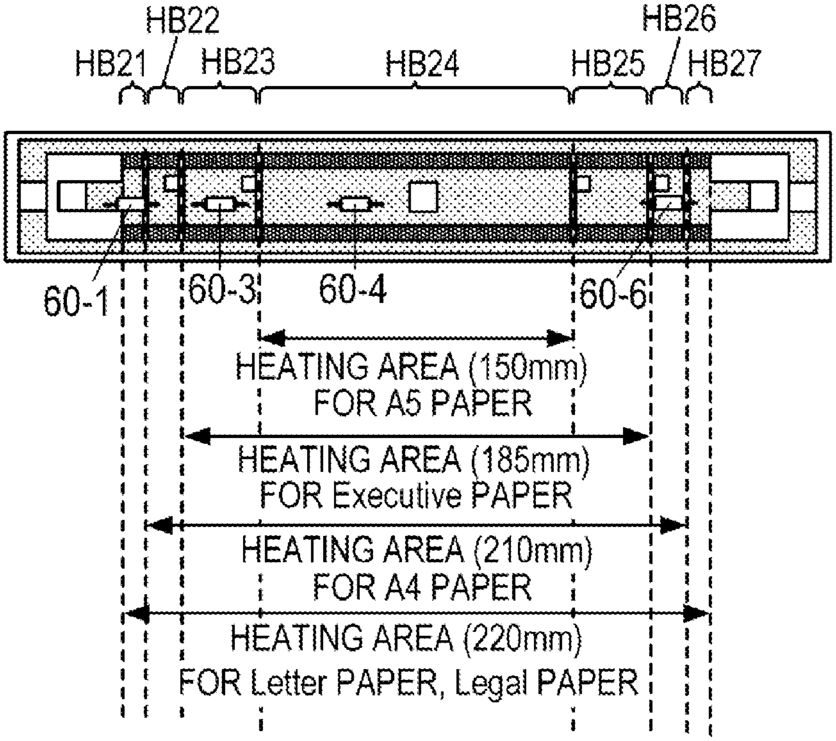

FIG. 9B is a schematic diagram showing the installation positions of the thermal fuses 60 of Embodiment 2. As shown in FIG. 9B, a thermal fuse 60-1 is installed in the heating block HB21, a thermal fuse 60-3 is installed in the heating block HB23, a thermal fuse 60-4 is installed in the heating block HB24, and a thermal fuse 60-6 is installed in the heating block HB26. By installing in this way, one or more thermal fuses 60 can be installed for each heating group without being restricted by the device layout.

Also in Embodiment 2, the combination of the heating blocks HB in which the thermal fuses 60 are installed is not limited to the combination described above. That is, the above-described arrangement is not limiting as long as the thermal fuses 60 are installed between a plurality of heating groups including a plurality of heating blocks HB so as not to be adjacent to each other between the adjacent heating blocks HB. For example, the heating blocks HB in which the thermal fuses 60 are installed may be the heating blocks HB22, HB24, HB25, and HB27.

The thermoswitch 50 shown in Embodiment 1 can also be used as a safety element for the heater 1200 of Embodiment 2. Furthermore, the thermal fuse 60 and the thermoswitch 50 can be used together. Also, in Embodiment 2, as in Embodiment 1, it is possible to insert a resin material or the like between the heater 1200 and the thermal fuse 60.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-025647, filed on Feb. 22, 2022, which is hereby incorporated by reference herein in its entirety.

What is claimed is:

1. An image heating device comprising:

a heater having a plurality of heating elements arranged in a width direction of a recording material that is perpendicular to a conveyance direction of the recording material;

a nip forming portion that forms a nip where the recording material is nipped; and a control portion that controls power supplied to the plurality of heating elements, wherein the image heating device heats an image formed on the recording material, which is nipped in the nip, by heat from the heater;

wherein the plurality of heating elements include a first heating element group, a second heating element group, and a central heating element, the first heating element group being arranged symmetrically with respect to a conveyance reference position of the recording material in the width direction, the second heating element group being arranged symmetrically with respect to the conveyance reference position so as to be adjacent to the first heating element group in the width direction, and the central heating element being arranged in an area of the conveyance reference position, wherein the control portion supplies power to the first heating element group through a first common circuit, supplies power to the second heating element group through a second common circuit, and supplies power to the central heating element through a circuit for the central heating element, wherein the image heating device includes a first safety element for shutting off the power supply to the first heating element group, the second heating element group, and the central heating element, and a second safety element for shutting off the power supply to the first heating element group, the second heating element group, and the central heating element, wherein the first safety element is arranged at a position corresponding to the first heating element group, and is arranged on one side with respect to the conveyance reference position in the width direction, wherein the second safety element is arranged at a position corresponding to the second heating element group and is arranged on the other side with respect to the conveyance reference position in the width direction, wherein only one first safety element is disposed at a position that satisfies both the position corresponding to the first heating element group and the position on the one side in the width direction, wherein the first safety element is the only one first safety element, wherein only one second safety element is disposed at a position that satisfies both the position corresponding to the second heating element group and the position on the other side in the width direction, wherein the second safety element is the only one second safety element, and wherein with respect to the width direction, a distance between the conveyance reference and the first safety element is smaller than a distance between the conveyance reference and the second safety element.

2. The image heating device according to claim 1, wherein the nip forming portion includes a tubular film in which the heater is arranged and a pressure member that contacts an outer surface of the film, and wherein the nip is formed between the film and the pressure member by the heater and the pressure member with the film interposed therebetween.

3. The image heating device according to claim 2, wherein the first safety element and the second safety element are arranged to contact a surface of the heater opposite to a surface of the heater forming the nip with the pressure member.

4. The image heating device according to claim 1, wherein the first safety element and the second safety element are thermostats, thermoswitches, or thermal fuses.

5. The image heating device according to claim 1, further comprising a relay for shutting off the power supply to the first heating element group, the second heating element group, and the central heating element, wherein the relay is provided in a power supply circuit to the first heating element group, the second heating element group, and the central heating element before branching to the first common circuit, the second common circuit, and the circuit for the central heating element, and wherein the relay shuts off the power supply by opening as a result of at least one of the first safety element and the second safety element being activated.

6. The image heating device according to claim 1, further comprising:

a first temperature detection element for detecting a temperature of the heating elements included in the first heating element group; and a second temperature detection element for detecting a temperature of the heating elements included in the second heating element group, wherein the control portion controls power supplied to the heating elements included in the first heating element group on the basis of the temperature detected by the first temperature detection element, and the control portion controls power supplied to the heating elements included in the second heating element group on the basis of the temperature detected by the second temperature detection element.

7. The image heating device according to claim 6, wherein the first temperature detection element and the second temperature detection element are thermistors.

8. An image forming apparatus comprising:

an image forming portion that forms an image on a recording material; and a fixing portion that fixes the image formed on the recording material to the recording material, wherein the fixing portion is the image heating device according to claim 1.

9. An image heating device for heating an image formed on a recording material, the image heating device comprising:

a tubular film contacting the recording material;

a heater provided in an inner space of the film, the heater including a first heating block group, a second heating block group, and a central heating block arranged in a width direction of the recording material that is perpendicular to a conveyance direction of the recording material;

a roller contacting an outer peripheral surface of the film and forming a nip for nipping the recording material in cooperation with the heater through the film;

a first switch for switching conduction/interruption of power supply to the first heating block group;

a second switch for switching conduction/interruption of power supply to the second heating block group;

a third switch for switching conduction/interruption of power supply to the central heating block;

a control portion controlling the first switch, the second switch, and the third switch;

a first safety element for shutting off the power supply to the first heating block group and the second heating block group; and a second safety element for shutting off the power supply to the first heating block group and the second heating block group, wherein the first heating block group includes two heating blocks arranged symmetrically with respect to a conveyance reference position of the recording material in the width direction, wherein the second heating block group includes two heating blocks arranged symmetrically with respect to the conveyance reference position so as to be adjacent to the first heating block group in the width direction, wherein the central heating block is arranged in an area of the conveyance reference position, wherein the first safety element is arranged at a position corresponding to a first heating element group, and is arranged on one side with respect to the conveyance reference position in the width direction, wherein the second safety element is arranged at a position corresponding to a second heating element group and is arranged on the other side with respect to the conveyance reference position in the width direction, wherein only one first safety element is disposed at a position that satisfies both the position corresponding to the first heating element group and the position on the one side in the width direction, wherein the first safety element is the only one first safety element, wherein only one second safety element is disposed at a position that satisfies both the position corresponding to the second heating element group and the position on the other side in the width direction, wherein the second safety element is the only one second safety element, and wherein with respect to the width direction, a distance between the conveyance reference and the first safety element is smaller than a distance between the conveyance reference and the second safety element.

10. The image heating device according to claim 9, wherein the first safety element and the second safety element are arranged to a surface side of the heater opposite to a surface side forming the nip with the roller.

11. The image heating device according to claim 9, wherein the first safety element and the second safety element are thermostats, thermoswitches, or thermal fuses.

12. The image heating device according to claim 9, further comprising a relay for shutting off the power supply to the first heating block group, the second heating block group, and the central heating block, wherein the relay is provided in a power supply circuit to the first heating block group, the second heating block group, and the central heating block before branching to a first common circuit for the first heating block group, a second common circuit for the second heating block group, and a circuit for the central heating block, and wherein the relay shuts off the power supply by opening as a result of at least one of the first safety element and the second safety element being activated.

13. The image heating device according to claim 9, further comprising a first temperature detection element for detecting a temperature of the first heating block group and a second temperature detection element for detecting a temperature of the second heating block group, wherein the control portion controls the first switch in accordance with the temperature detected by the first temperature detection element, and controls the second switch in accordance with the temperature detected by the second temperature detection element.

14. The image heating device according to claim 13, wherein the first temperature detection element and the second temperature detection element are thermistors.

15. The image heating device according to claim 9, wherein the first switch, the second switch, and the third switch are TRIACs.

16. An image forming apparatus comprising:

an image forming portion that forms an image on a recording material; and a fixing portion that fixes the image formed on the recording material to the recording material;

wherein the fixing portion is the image heating device according to claim 9.

* * * * *